(12) United States Patent
Giovanelli et al.

(10) Patent No.: US 7,393,311 B1
(45) Date of Patent: Jul. 1, 2008

(54) MONITORING METHOD AND SYSTEM FOR A TOOL-HOLDING SPINDLE

(75) Inventors: Gian Luca Giovanelli, Castagneto Po (IT); Andrea Gay, Turin (IT)

(73) Assignee: Vigel S.p.A., Borgaro Torinese (IT)

( * ) Notice: Subject to any disclaimer, the term of this patent is extended or adjusted under 35 U.S.C. 154(b) by 0 days.

(21) Appl. No.: 11/984,851

(22) Filed: Nov. 23, 2007

(30) Foreign Application Priority Data

Dec. 29, 2006 (EP) ............................... 06425871

(51) Int. Cl.
*B23Q 3/157* (2006.01)
*B23C 5/26* (2006.01)

(52) U.S. Cl. .............................. 483/1; 483/12; 409/131; 409/233

(58) Field of Classification Search .................. 483/1, 483/2, 7, 10, 11, 12, 13; 409/233, 232, 231, 409/131, 132, 134; 408/1 R, 239 R, 239 A, 408/8
See application file for complete search history.

(56) References Cited

U.S. PATENT DOCUMENTS

| | | | | |
|---|---|---|---|---|
| 3,520,228 A | * | 7/1970 | Wohlfeil | 409/233 |
| 4,583,894 A | * | 4/1986 | Mitchell | 409/233 |
| 4,628,586 A | * | 12/1986 | Yoshimi et al. | 483/30 |
| 5,613,929 A | * | 3/1997 | Bayer | 483/1 |
| 5,783,887 A | * | 7/1998 | Ueyama et al. | 310/90.5 |
| 6,354,776 B1 | * | 3/2002 | Selci | 409/233 |
| 6,497,538 B1 | * | 12/2002 | Lind | 409/233 |
| 7,217,230 B2 | * | 5/2007 | Hyun | 483/31 |
| 7,318,692 B2 | * | 1/2008 | Herla | 409/233 |
| 2002/0164220 A1 | * | 11/2002 | Sailing | 409/131 |
| 2002/0189120 A1 | | 12/2002 | Kaneda et al. | |
| 2006/0002778 A1 | | 1/2006 | Hangleiter | |
| 2006/0147287 A1 | | 7/2006 | Takaku | |
| 2006/0239788 A1 | * | 10/2006 | Hyun | 409/233 |

FOREIGN PATENT DOCUMENTS

| | | | | |
|---|---|---|---|---|
| JP | 54-113580 A | * | 9/1979 | |
| JP | 06-170619 A | * | 6/1994 | |
| JP | 11 114707 A | | 4/1999 | |
| JP | 2002-052406 A | * | 2/2002 | |

* cited by examiner

*Primary Examiner*—Erica E Cadugan
(74) *Attorney, Agent, or Firm*—Modiano & Associati; Albert Josif; Daniel J. O'Bryne

(57) ABSTRACT

A sensor detects an axial position of a rod controlling a tool-gripping collet in a tool-holding spindle whenever a tool is picked during a working session. The current obtained rod position value is compared with previous rod position value, which has been obtained and stored during the previous tool-picking and, if their deviation is larger than a predetermined threshold, the collet closure is notified as defective. The rod position is obtained as an average of a plurality of closely spaced readings, which are taken after a predetermined delay from the collet closure.

7 Claims, 4 Drawing Sheets

MONITORING METHOD AND SYSTEM FOR A TOOL-HOLDING SPINDLE

This invention is concerned with a method and a system for monitoring a tool-holding spindle in a tool machine, in order to determine whether a tool picked by the spindle from a tool crib in preparation to a machining operation has been properly gripped in its collet.

BACKGROUND OF THE INVENTION

When a machine cycle is to be repeatedly carried out with different tools, tool machines are programmed for operating a spindle through a working cycle such that the spindle will pick a chosen tool from a tool crib, will clamp its collet on the tool shank, will carry out the programmed operation on the workpiece and finally will return the tool to the tool crib. Two facing, annular registering surfaces on the spindle and the tool, respectively, axially abut with each other to insure that the tool is properly coupled with the spindle, so that a good degree of accuracy and repeatability is achieved.

However, minute chips may deposit on the registering surface during machining, which often stick to it, due to the capillarity of the cooling/lubricating fluid that is always present in the area. If the chip fragment is very small, of the order of a few hundredths of a millimeter (a few tens of microns) thickness, the compressed air usually blown over the spindle before picking the tool may be unable to remove it, and the chip will therefore be pinched between the abutted registering surfaces, thereby preventing the collet from closing, or, alternatively, causing a positioning error, generally involving a lack of coplanarity of the registering surfaces, whereby the tool is inclined with respect to the axis of the spindle.

It is known to provide the spindle head with a proximity sensor arranged for detecting the axial position of a control rod controlling the opening and closing of the collet, and for notifying a collet-clamping error in case of an incomplete stroke of the rod. However, such sensor is only able to notify coarse errors, due to the unavoidable variation in the nominal end of stroke of the control rod in different tools. Consequently, the above sensor is unable to detect very small fragments, which, however, as stated above, do cause a deviation of the tool axis from the spindle axis, with consequent linear errors amounting up to several tenths of a millimeter at the tool tip.

SUMMARY OF THE INVENTION

The aim of the present invention is to provide a method and a system for monitoring a tool-holding spindle in a tool machine, in order to determine whether a tool has been properly gripped in the spindle collet without any foreign particles coming in between, however small.

The above aim, as well as other objects and advantages such as will appear from the following disclosure, is attained by the invention by a method for monitoring tool-holding spindles, having the features recited in claim 1, the claims dependent from it reciting other advantageous though secondary features. The invention also concerns a system for carrying out the above method, as recited in claim 7.

BRIEF DESCRIPTION OF THE DRAWINGS

The invention will now be described in more detail below, with reference to a preferred embodiment, shown by way of nonlimiting example in the attached drawings, wherein.

DESCRIPTION OF THE PREFERRED EMBODIMENTS

Figure 1:
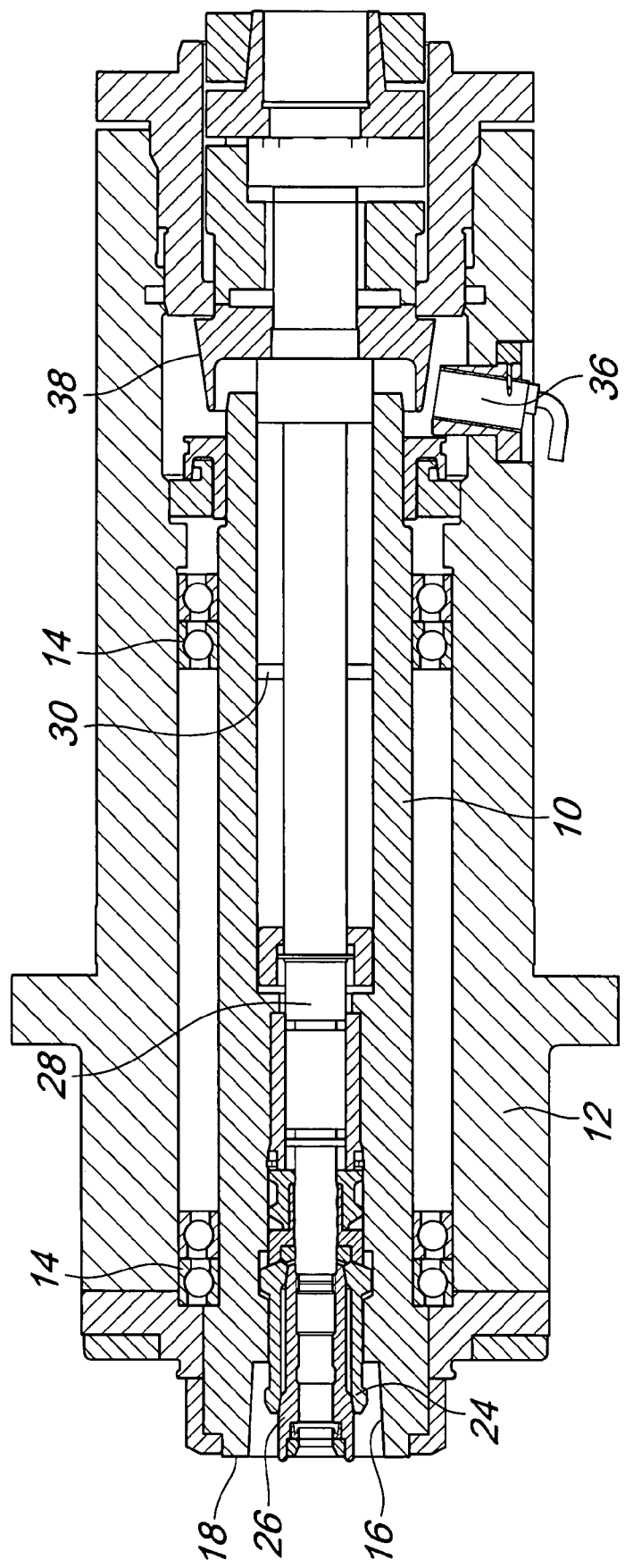
FIG. 1 is a view in axial cross-section, partly schematic, of a tool-holding spindle belonging to the system of the invention, holding no tool.
Figure 2:
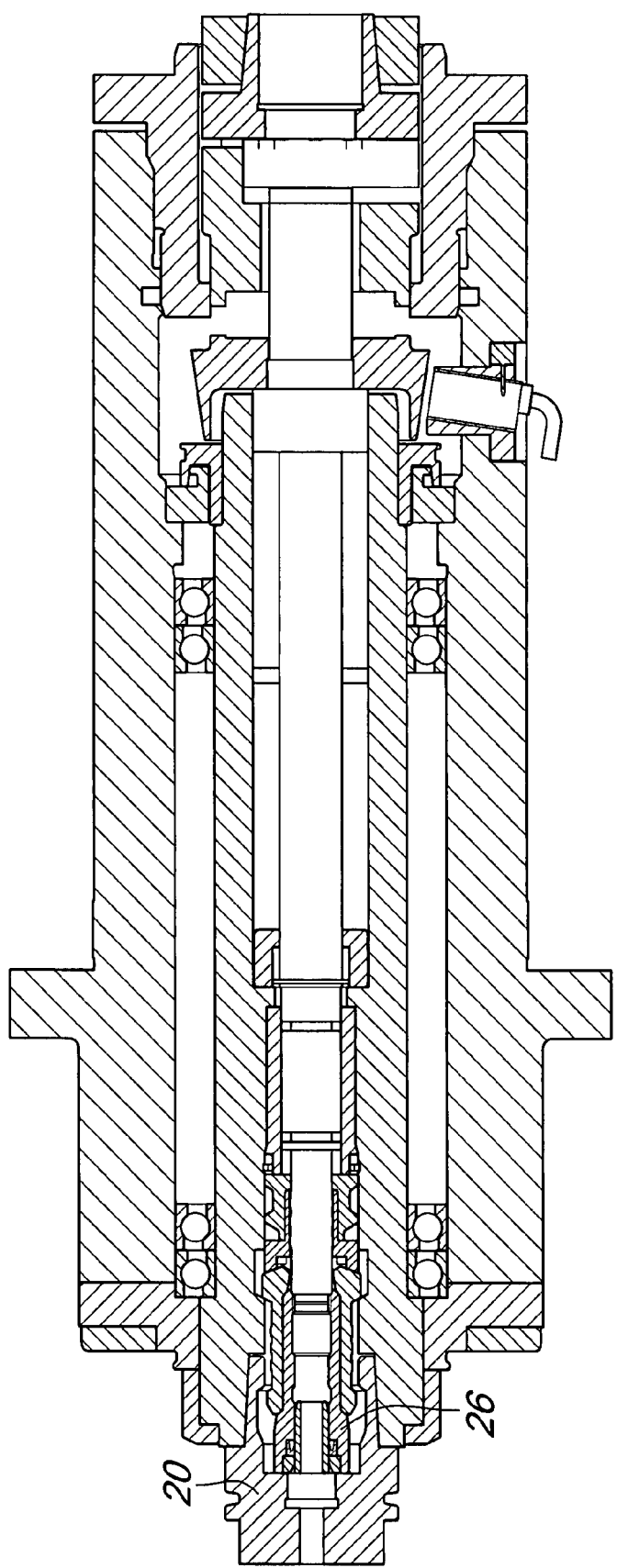
FIG. 2 is a view similar to FIG. 1, showing the spindle with unclamped tool.
Figure 3:
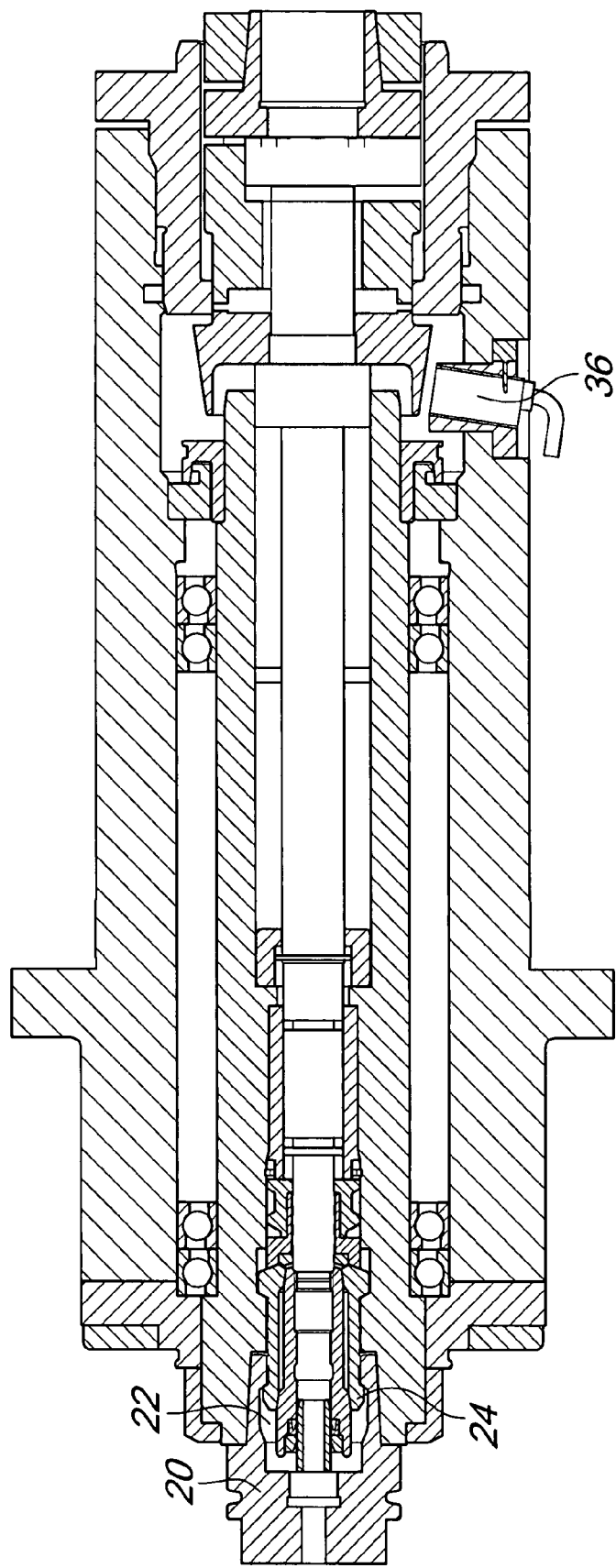
FIG. 3 is a view similar to FIG. 1, showing the spindle with clamped tool.

With reference to FIGS. 1-3, a spindle 10 is journaled in a tool machine 12 through ball bearings 14. Spindle 10 is hollow and has, at its operating end, a frusto-conical socket 16 and a coaxial flat, annular registering surface 18 which can receive a frusto-conical shank 20 of a tool (FIGS. 2 e 3). Shank 20 has an axial, shaped recess 22, which, also in a way known per se, can be engaged by a clamping member or collet comprising a plurality of tongues or reeds 24, which can be radially withdrawn or expanded by the longitudinal shifting of a mushroom-shaped head 26 carried at the end of a control rod 28, which is axially shiftable within the spindle. A compression spring 30 biases rod 28 to a backward position in which head 26 expands the collet outwardly. A hydraulic drive (not shown) is able to push rod 28 forward, as known per se, against the bias of spring 30, thereby withdrawing reeds 24 to a contracted condition which frees tool 20. An analog proximity sensor 36, which may be capacitive or inductive, is mounted in a stationary position in the tool machine, so that it will interact with a conical surface 38 that is coaxial and integral with control rod 28. The sensor can therefore sense the axial position of the rod by measuring the distance from the conical surface.

In order to load a tool, the spindle, with spread-out collet as shown on FIG. 1, moves forward in front of the shank 20 of a desired tool carried in a tool crib (not shown), and the control rod 28 is then pushed forward by the hydraulical drive in order to withdraw the locking reeds 24 and thereby allow the shank (as shown on FIG. 2) to move into the frusto-conical socket 16, until the annular surface 18 of the spindle abuts against a corresponding annular surface on the shank. Control rod 28 is then released and is shifted by spring 30 (FIG. 3) in order to spread the collet reeds and clamp the tool.

If a chip fragment of about a tenth of a millimeter thickness is pinched between the two facing annular surfaces, the fragment will cause an axial rod position error that is generally smaller than the error threshold measurable by sensor 36, although the error will affect the machining accuracy, because the tool, due to the chip, will take a slightly inclined position with respect to the spindle axis, and the linear error at the tip of the tool will be amplified.

Figure 4:
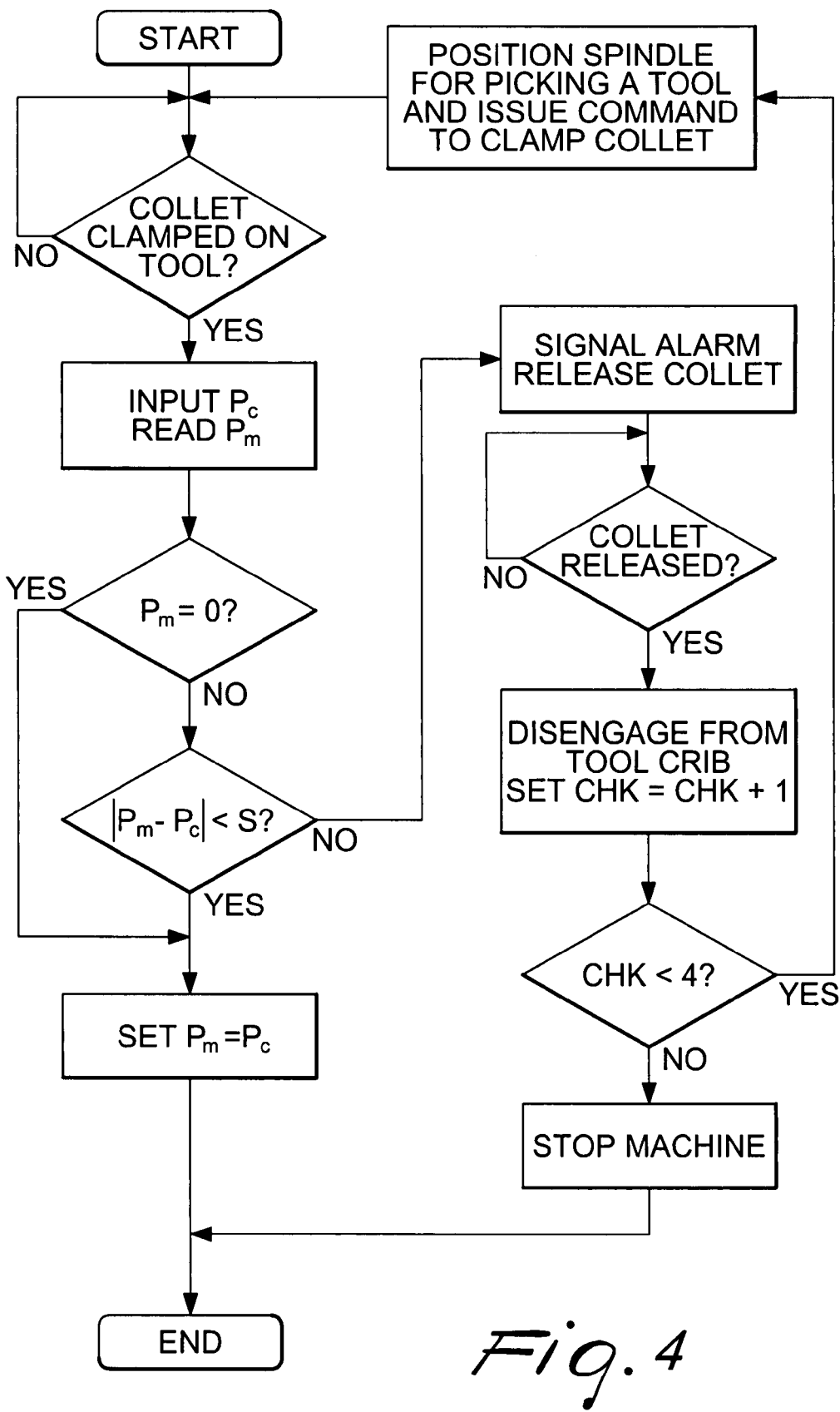
FIG. 4 is a flowchart showing the monitoring method according to a preferred embodiment of the invention.

The method of the invention is illustrated in the flowchart of FIG. 4. Whenever a given tool is picked from a tool crib (not shown), the tool is allowed to be clamped, and the current position $P_c$ of the control rod is then measured by the sensor 36. Preferably, a measurement of the current position $P_c$ is obtained by taking a set of successive readings $P_{c1}, P_{c2}, \ldots, P_{cn}$, at close time intervals, e.g. five readings (not shown in detail in FIG. 4 for simplicity), starting with a predetermined delay T after checking that the closure of the collet has been completed, and then by assuming the average of the readings as measurement $P_c$. The number of readings is chosen as an acceptable compromise between the time required to perform the measurement and the accuracy of the measurement. The interval between any two successive readings is chosen, e.g., as 10-15 msec, and the delay time T is chosen such that the transients are masked and the sensor output is stabilized, typically as 100 msec.

The value of the current position $P_c$ is then compared with the position $P_m$ that was obtained and stored for the same tool in the previous cycle. If the two values $P_m$ and $P_c$ differ by less than a predetermined deviation S, the collet closure is regarded as regular and the work cycle is allowed to proceed, while the current value $P_c$ is substituted for the stored value $P_m$. If, on the other hand, the difference between the two values $P_m$ and $P_c$ is larger than the deviation threshold S, the closure is considered to be anomalous, the tool machine is stopped, and an alarm signal for operator is emitted.

Alternatively, and in fact preferably, as shown in FIG. 4, whenever the above comparison detects a defective closure, rather than immediately stopping the tool machine, the collet is released, the spindle is backed off from the tool crib and the collet is again clamped, the above described position measurement is repeated, and the stored position $P_m$ is again compared with current position $P_c$. This attempt is repeated a few times, e.g. four times as shown, and if the comparison continues to have an anomalous issue, the tool machine is stopped at the fourth failure, and the operator is warned by means of an alarm signal. It has in fact been found that a repeated release and clamping of the collet is often sufficient to remove or crumble the fragment, thereby detaching it from the surface to which it was clinging.

At the beginning of each working session, when a previous position has not yet been stored for a tool, the value for the previous position $P_m$ is set to zero, and it is therefore impossible to make a comparison. Accordingly, when first picking a tool the collet closure is always assumed to be regular, and the current rod position $P_c$ is stored directly as a value for the previous rod position $P_m$. This step is equivalent to abstain from monitoring the first tool picking, and may give rise not only to a defective tool alignment in the first machining operation performed, but also to an erroneous measurement in the second operation that will be carried out by the same tool. Such a circumstance is highly unlikely, and will be corrected, in any case, starting with the third operation.

In a typical case given by way of example, the proximity sensor has a sensitivity of a 10 mV variation of the generated voltage for each 10 μm variation in the distance from the observed surface. The threshold S is chosen at 25 mV, which nominally correspond to the ability to sense a thickness of about 25 μm, although in practice only foreign particles of at least 40 μm thickness can be guaranteed to be detected.

It is understood that changes can be made in the preferred embodiment of the method as described above, particularly with respect to the values of the threshold S and the delay T, as well as in the number of readings taken by the sensor for computing an average, and also in the number of tool-picking attempts made. Moreover, it should be noted that, for the sake of simplicity, no mention has been made of a number of options and functions that are normally available in the numeric control of tool machines, such as displays, possibility for the operator to activate or suppress desired functions, change parameters such as S or T, and the like.

The disclosures in European Patent Application No. 06425871.8 from which this application claims priority are incorporated herein by reference.

What is claimed is:

1. A monitoring method for a tool-holding spindle having a tool-gripping collet driven by an axially shiftable control rod, and a sensor positioned for sensing an axial position of the rod and delivering an output signal as a function of said position, comprising, whenever each tool is initially picked from a tool crib in a working session, the steps of:
   (a) after checking that the collet is closed, taking a predetermined number of readings of a position of the control rod ($P_{c1}$, $P_{c2}$, ..., $P_{cn}$) by means of said sensor, at predetermined intervals starting from a predetermined delay (T) after the closure of the collet;
   (b) computing a current average of said readings ($P_{c1}$, $P_{c2}$, ..., $P_{cn}$) whereby a value for the current position of the rod ($P_m$) is obtained;
   (c) notifying that the collet closure is regular and storing said current position value ($P_c$) as previous position value ($P_m$);
   and further comprising the steps, to be carried out when subsequently picking the respective tool within the same working session, of:
   (d) taking said predetermined number of rod position readings ($P_{c1}$, $P_{c2}$, ..., $P_{cn}$) by means of said sensor, at said predetermined intervals starting from a predetermined delay (T) after the closure of the collet;
   (e) computing the current average of said readings ($P_{c1}$, $P_{c2}$, ..., $P_{cn}$) whereby a fresh value for the current rod position ($P_c$) is obtained;
   (f) comparing the current rod position value ($P_c$) with the corresponding stored previous rod position value ($P_m$) and, if their deviation is less than a predetermined threshold (S), notifying that the collet closure is regular, and otherwise notifying that the collet closure is defective;
   (g) if the collet closure is regular, storing said current rod position value ($P_c$) as previous rod position value ($P_m$).

2. The spindle-monitoring method of claim 1, wherein the following cycle of rescue steps is repeated at least once whenever the collet closure is defective:
   (h) actuating in succession a release of the spindle collet, a disengagement of the spindle from the tool crib, a re-engagement of the spindle with the tool crib, and a re-clamping of the collet;
   (i) repeating steps (d), (e), (f), (g);
   (j) if, at the end of the above cycle, the collet closure is ascertained to be defective, stopping the operation of the tool machine and notifying an alarm signal to an operator.

3. The spindle-monitoring method of claim 2, wherein said cycle of rescue steps is repeated three times before stopping the tool machine.

4. The spindle-monitoring method of claim 1, wherein said predetermined number of rod position readings ($P_{c1}$, $P_{c2}$, ..., $P_{cn}$) is 5.

5. The spindle-monitoring method of claim 1, wherein said predetermined delay (T) is about 100 msec.

6. The spindle-monitoring method of claim 1, wherein said predetermined deviation threshold (S) is about 25 mV.

7. A tool machine system having a tool-carrying spindle with a tool-gripping collet driven by the axial shift of a control rod and a sensor arranged for detecting an axial position of the rod and delivering an output signal as a function of said position, and an electronic control unit connected for controlling said collet and for reading an output of said sensor, wherein the control unit is programmed for executing the monitoring method of claim 1.

* * * * *